United States Patent
Lopez Gomez et al.

[11] Patent Number: 6,003,232
[45] Date of Patent: Dec. 21, 1999

[54] INSTALLATION FOR MEASURING THE WHEEL OFFSET OF RAILWAY VEHICLES

[75] Inventors: Jose Luis Lopez Gomez; Jose Julio Lorente Casado, both of Madrid, Spain

[73] Assignee: Patentes Talgo,S.A., Madrid, Spain

[21] Appl. No.: 08/909,955

[22] Filed: Aug. 12, 1997

[30] Foreign Application Priority Data

Aug. 22, 1996 [ES] Spain ................................. 9601833

[51] Int. Cl.⁶ ........................... G01M 17/10; G01B 5/20; G01B 121/14; G01B 121/24
[52] U.S. Cl. ........................... 33/203; 33/203.15; 33/552; 73/865.8
[58] Field of Search ............................... 73/865.8, 865.9, 73/105; 33/203, 203.11, 203.12, 203.15, 203.16, 540, 552, 553, 554

[56] References Cited

U.S. PATENT DOCUMENTS

| | | | |
|---|---|---|---|
| 4,099,333 | 7/1978 | Forster | 33/203.12 |
| 4,110,910 | 9/1978 | Dombrowski | 33/203.15 X |
| 4,233,745 | 11/1980 | Ramon et al. | 33/533 X |
| 4,268,968 | 5/1981 | Przybylinski et al. | 33/203.11 X |
| 4,445,278 | 5/1984 | Staudinger | 33/203.12 |
| 4,576,044 | 3/1986 | Boni | 33/203.12 X |
| 5,555,632 | 9/1996 | Naumann et al. | 73/105 X |
| 5,574,233 | 11/1996 | Oliver et al. | 73/865.81 X |

FOREIGN PATENT DOCUMENTS

| | | | |
|---|---|---|---|
| 0555169 | 8/1993 | European Pat. Off. | |
| 0751371 | 1/1997 | European Pat. Off. | |
| 144740 | 11/1980 | German Dem. Rep. | 33/203 |
| 213493 | 9/1984 | German Dem. Rep. | 33/203 |
| 289017 | 4/1991 | German Dem. Rep. | 33/203 |
| 3522809 | 1/1987 | Germany | 33/203 |
| 3637839 | 5/1987 | Germany . | |
| 6123608 | 5/1994 | Japan . | |
| 2029697 | 2/1995 | Russian Federation . | |
| 677972 | 8/1979 | U.S.S.R. | 33/203 |
| 696277 | 11/1979 | U.S.S.R. | 33/203 |
| 2183840 | 10/1987 | United Kingdom . | |
| 9012720 | 11/1990 | WIPO | 33/203 |

OTHER PUBLICATIONS

Patent Abstracts of Japan of JP 06123608A of May 6, 1994.
Abstract of RU 2029697 dated Feb. 27, 1995.
Abstract of DE 3637839 dated May 27, 1987.

*Primary Examiner*—Thomas P. Noland
*Attorney, Agent, or Firm*—Ladas & Parry

[57] ABSTRACT

Installation for measuring the wheel offset of railway vehicles. It makes it possible to obtain three circumferential profiles of the zone of contact of the running tread of said wheels as the railway vehicles travel at low speed over the installation. Once the data have been processed by computer equipment, the offset and the shape error are detected in real time. The installation is made up of equipment, at the foot of the track, formed by a running support with its guard rail, wheel-position sensors, a system for picking up radial displacements and an electronic control system. This system transmits the data to computer equipment where the process is carried out and the statistics generated and in which the results are displayed and stored.

6 Claims, 3 Drawing Sheets

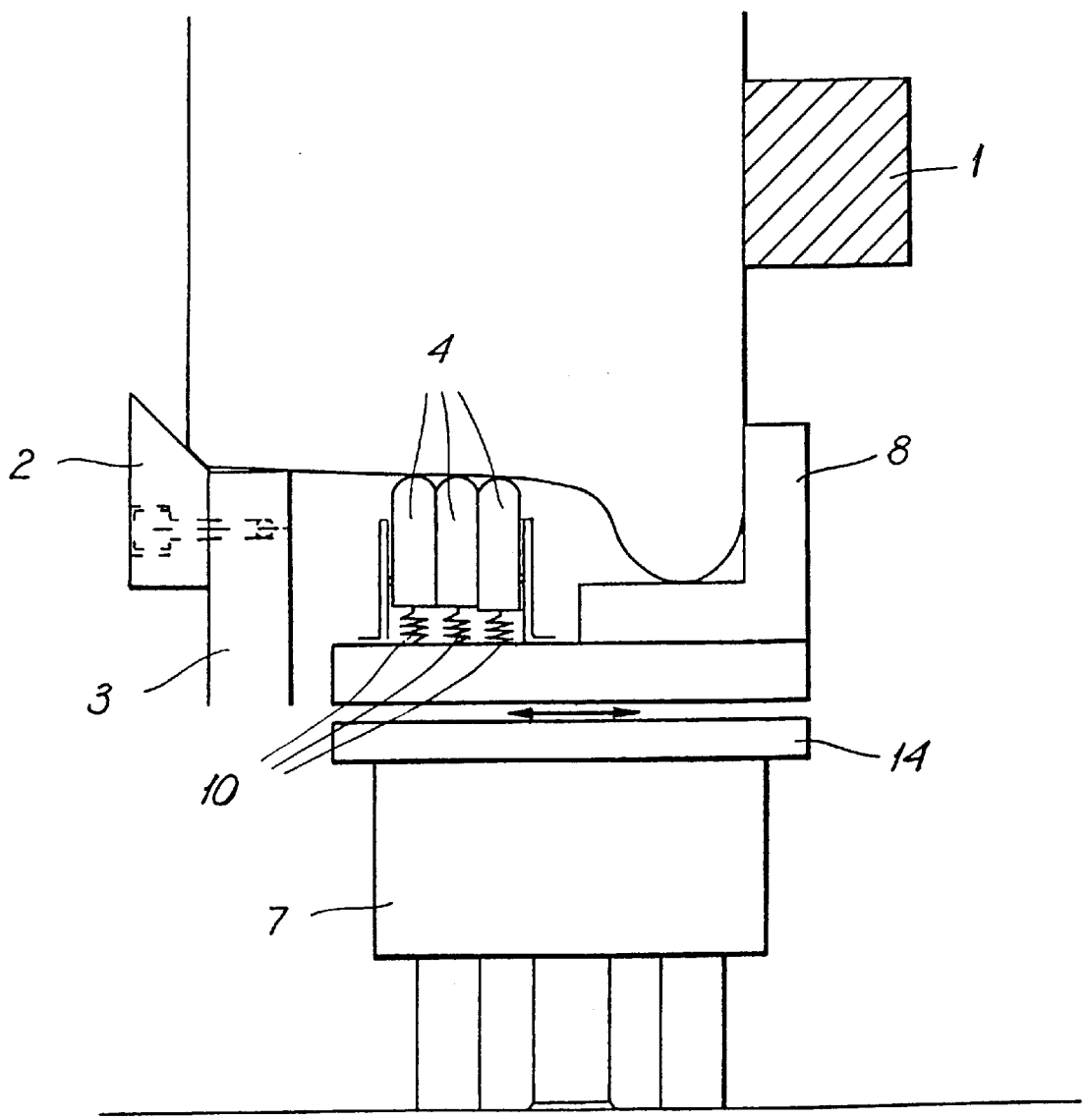
F I G. 1

INSTALLATION FOR MEASURING THE WHEEL OFFSET OF RAILWAY VEHICLES

FIELD OF THE INVENTION

The present invention relates to an installation for measuring the wheel offset of railway vehicles which has been designed to obtain three circumferential profiles of the zone of contact of the running tread of wheels of railway vehicles as they travel at low speed over said installation.

The installation of this invention may be constructed on any type of track over which the vehicles travel at shunting speed, and may be located inside the sheds or outside the latter. The measurements made on the vehicles which travel over these tracks are processed and sent to the rolling-stock maintenance centres so that the operations to correct any defects detected in the condition of the wheels can be carried out there.

As is known, offset in railway wheels gives rise, from certain values upwards, to the occurrence of vibrations and noise which increase in level in step with the speed of travel.

The occurrence of flat spots in the running tread also gives rise to a notable reduction in comfort.

Modern trains therefore have to undergo increasingly rigorous inspections to comply with the more stringent current requirements regarding their safety and comfort. It is essential, under such conditions, to monitor the condition of the running tread so as to detect any type of damage.

In the event that preventive maintenance of the wheels of railway vehicles is envisaged, it is necessary to carry out regular monitoring of the offset and to rectify this, and therefore investment in an installation for measuring the wheel offset of railway vehicles moving at shunting speed is immediately reflected in an increased level of comfort and a marked speeding-up of maintenance work, with the concomitant economic saving.

BACKGROUND OF THE INVENTION

Documents are known in which the problem of measuring the conditions of the wheels of railway vehicles has been addressed. Thus, Patent Application ES P9501305 describes an installation and a procedure for measuring running parameters on the wheels of railway vehicles, in which use is made of laser generators and cameras for obtaining images corresponding to the profile or to the diameter of a wheel, these images being sent to analytical equipment and the results of the analysis being transmitted to a computer for processing and display on a monitor; Patent EP-A-0 467 984 describes an installation for detecting the profile of train wheels using an illumination unit, a probe unit, a measuring unit and a data processor; and Patent JP-A-06-123608 describes a device for measuring wheels by forming images corresponding to the shape of the surface of the running tread and of the inner face of the wheels and by calculating, on the basis of these images, the shape of the surface of the running tread and the diameter of the wheels.

SUMMARY OF THE INVENTION

On the basis of the known state of the art, the present invention has developed an installation which is capable of generating a reproduction of three circumferential profiles of the running tread of a wheel. Constructing these graphs offers information as to the shape the wheel offset has (appearance of polygonal shapes, clover-leaf shapes, etc.), and it is therefore possible to study the different causes of the problem and to rectify them in due time. Similarly, the invention makes it possible to detect flat spots on the wheels, irrespective of their position on the running tread, by virtue of the three graphs which the installation provides.

The installation according to the invention will have a useful length which is at least equal to the length of the development of the circumference of the wheel whose profile it is desired to obtain, it being possible for this length to be divided into the necessary measurement sections in accordance with design criteria.

In the installation of the invention, the reference for measurement of the offset is the maximum circumference of the flange perpendicular to the axis of the wheel. Because it is not an active zone, no offset occurs in said flange.

According to the invention, the installation basically comprises, in each of its sections and for each rail of the track, an inner guiding guard rail and an outer guiding ramp which forms an angle of 45° and which acts on the running chamfer on the inner face of the wheel, the guard rail and the ramp interacting in order to centre the wheels and to prevent any lateral displacement thereof during measurement; a steel profile which forms the running support for the wheels and which, once the wheels have been centred, reduces its thickness, causing running to take place on that part of the running profile of the wheel which is opposite its flange and thus leaving space for the measurement to be made; a pneumatic subsystem which, as the train passes, activates the measurement installation, raising its components and retracting them once the measurement operation has been completed; an L-shaped reference rule which is placed in contact with the flange of the wheel as the latter passes and which is rigidly joined to a base which can be raised by pneumatic cylinders; mechanical feelers which pick up the displacement between the flange of the wheel, taken as reference zone, and the three points of its running profile to be measured, giving rise to the generation of electrical signals which are used to determine the circumferential profile of the wheel; an electronic system for processing said signals; and a computer system for presenting, on a monitor, graphs showing the profile, the offset and the shape error of the wheel.

The installation of the invention preferably includes two pneumatic cylinders for raising the base of the reference rule.

Moreover, said mechanical feelers consist of narrow rules which are each joined together at the base of the reference rule by means of individual articulated mechanisms and which act directly on potentiometers which generate said electrical signals. It is advantageous for the installation to incorporate three such rules.

According to the invention, encoders, for generating electrical revolution signals, from which the displacement of said rules vis-à-vis the circumferential profile of the wheel is indirectly obtained, are mounted on said articulated mechanisms.

According to the invention, it is expedient for said articulated mechanisms to be stressed by springs which cause said rules always to remain in contact with the running profile of the wheel.

BRIEF DESCRIPTION OF THE DRAWINGS

The invention will now be described in greater detail with reference to the appended drawings which diagrammatically illustrate an installation constructed according to the invention, in which:

FIG. 1 shows a profile view of part of the installation of the invention;

DETAILED DESCRIPTION OF THE INVENTION

As may be seen in FIG. 1 of the drawings, the installation of the invention includes an inner guiding guard rail 1 which interacts with an outer guiding ramp 2. This ramp forms an angle of 45° and acts on the running chamfer on the outer face of the wheel. The ramp 2 interacts with the guard rail 1 so as to prevent any displacement of the wheels during measurement, the wheels remaining perfectly centred.

A running support 3, consisting of a steel section, gives continuity to the head of the rail. Once the wheel has been centred using the guard rail 1 and the ramp 2, the running support 3 reduces its thickness, with the result that running takes place on the part opposite the flange of the wheel and space is thus left for making the measurement.

Figure 2:
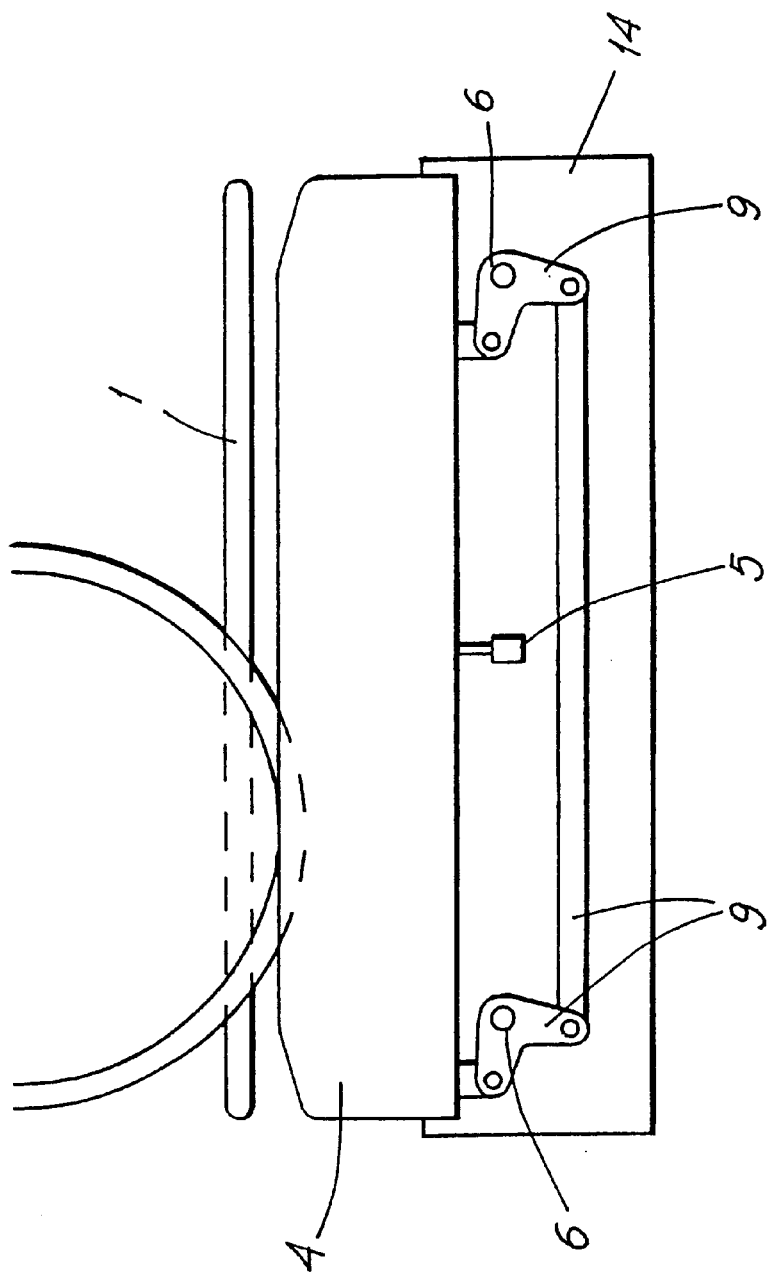
FIG. 2 shows a view in lateral elevation of part of the installation of the invention.
Figure 3:
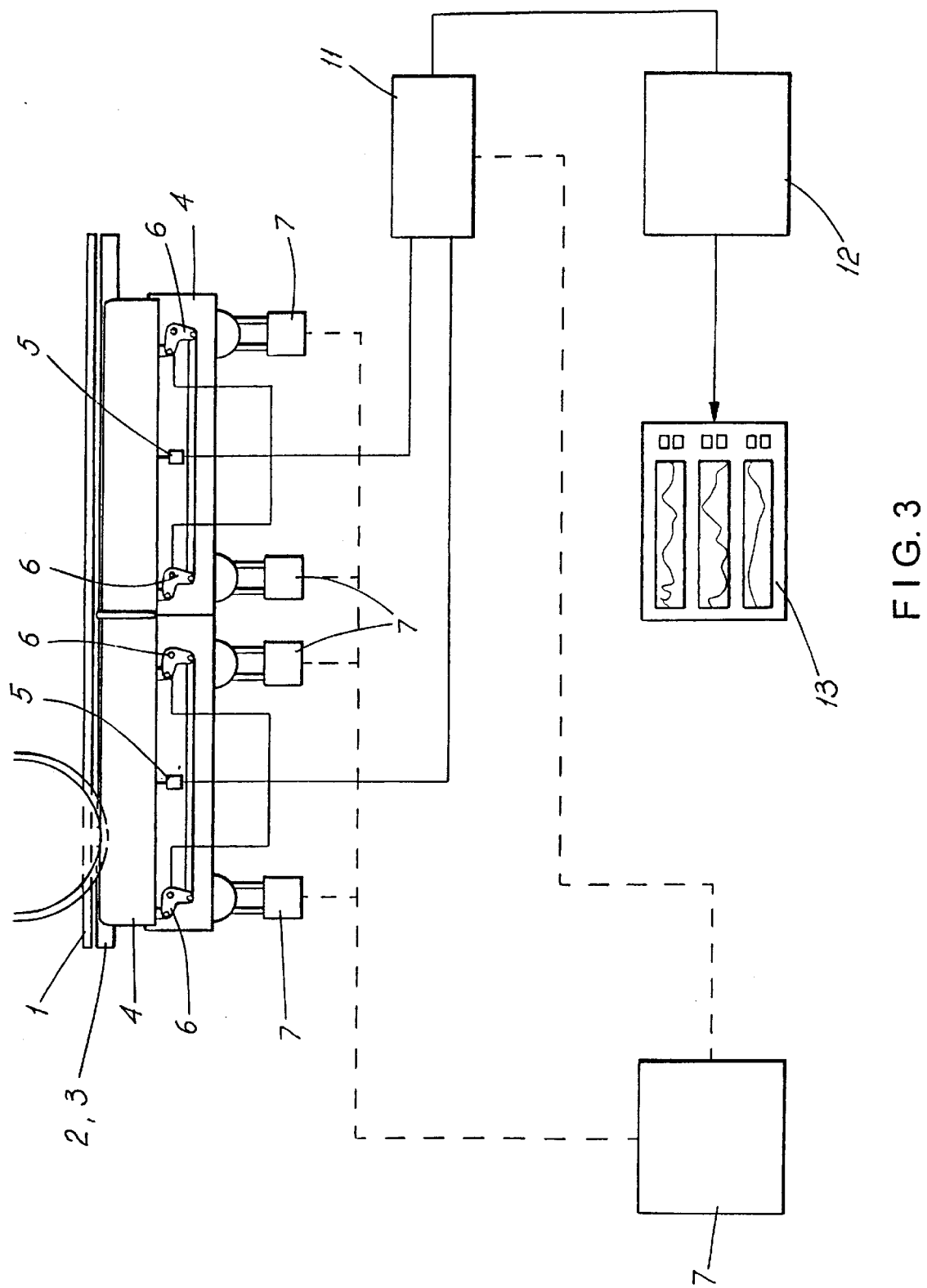
FIG. 3 shows a complete view of the installation of the invention.

Mechanical feelers 4, which act directly on potentiometers 5 (FIGS. 2 and 3), are used to pick up the displacements which occur between the flange of the wheel (reference zone) and the three points of the running profile at which it is desired to carry out the measurement operation. As an alternative, use may be made of encoders 6 (FIGS. 2 and 3) which, located on articulated mechanisms 9 (FIG. 2), supply a revolution signal from which the displacements are indirectly obtained. Thus, as the wheel passes over the measurement installation, an electrical signal is obtained which expresses the difference in height between the flange of the wheel and the point of its running profile at which it is desired to obtain the circumferential profile of the wheel.

As stated previously, the useful length of the measurement installation is at least equal to the length of the development of the circumference of the wheel whose profile is to be obtained and this length can be divided into the necessary measurement sections in accordance with design criteria. Each measurement section is covered by a pick-up system which consists of a pneumatic subsystem 7, a reference rule 8 and three rules 4 which form the abovementioned mechanical feelers.

The pneumatic subsystem 7, which is actuated by a sensor activated as the wheel passes over the measurement installation, raises the displacement-pick-up system so that the wheel can be placed in contact with the rules 4. This subsystem 7 activates the measurement installation as the train passes, raising the installation's components and retracting them once the measurement operation has been completed. The installation may also be inactive so as to allow the passage of trains without measurements being made.

The reference rule 8 has an L shape and, as the wheel passes, is placed in contact with the flange of the latter, also bearing, by virtue of its L shape, on the inner face of the wheel. This rule 8 is designed to serve as a reference for measuring the offset and is rigidly joined to a base 14 which may be raised by pneumatic cylinders, preferably two cylinders. This assembly can move vertically so as to enter into contact with the running profile of the wheel and can move transversely so as to adapt to the inner face of the wheel and ensure that circumferential profiles are always obtained within a plane perpendicular to the plane of the wheel.

The rules 4 are very narrow and are each joined to the base 14 of the reference rule 8 by means of one of said articulated mechanisms 9. In this way, only vertical displacement is allowed, always keeping the three rules 4 parallel to the reference rule 8. These articulated mechanisms 9 are responsible for preventing any possible error of revolution which would falsify the displacement measured between the reference rule 8 and the other three rules 4. In this way, irrespective of the position in which contact between the wheel and the rules 4 comes about (at the ends or in intermediate zones), the installation of the invention supplies a correct value of the difference in height between the flange and the point of the running profile of the wheel at which it is desired to obtain the circumferential profile of the wheel.

The articulated mechanisms 9 are urged by springs 10 which keep the rules 4 always in contact with the running profile of the wheel. The vertical displacement of each of these rules 4 with respect to the reference rule 8 may be transmitted directly to the respective potentiometer 5 whose signal, duly processed, will be used to obtain the circumferential profile of the corresponding wheel, with reference to the circumference of maximum diameter of its flange.

This vertical displacement may also be measured indirectly in the installation of the present invention by using the encoders 6 which are mounted on the articulated mechanisms 9, said encoders relating the revolution of the articulated mechanisms to the displacement to be measured.

The zone of the rules 4 which initiates contact with the wheel is specifically designed to prevent a sudden engagement and to avoid impacts which might cause the installation to stop operating properly. Moreover, the three rules 4 are displaced vertically, sliding with respect to one another and producing friction damping which absorbs vibrations and inertia forces.

An electronic system 11 is responsible for electronically processing the signals received from the potentiometers 5 or from the encoders 6, whilst a computer system 12 will make it possible to obtain the graphs corresponding to the profile, the offset and the shape error of the wheel and to display them on a monitor 13.

By applying the installation of the present invention, it will be possible to obtain precise information on any offset defects in the wheels of railway vehicles and the measures necessary for rectifying these may then be adopted.

The above description of the invention brings together the essential aspects thereof but, as experts in the field will understand, certain modifications could be made to the installation described and illustrated without thereby departing from the scope of the invention. It is therefore intended that the scope of the invention should be limited solely and exclusively by the content of the attached claims.

What is claimed is:

1. Installation for measuring the wheel offset of railway vehicles which has a useful length which is at least equal to the length of the development of the circumference of the wheel whose profile it is desired to obtain, it being possible for this length to be divided into the necessary measurement sections in accordance with design criteria and the installation being constructed in such a manner that three circumferential profiles of the zone of contact of the running tread of the wheels with a running support (3) are obtained as the railway vehicles travel at low speed through said installation, characterized in that it comprises, in each of its sections and for each rail of the track, an inner guiding guard rail (1) and an outer guiding ramp (2) which forms an angle of 45° and which acts on a running chamfer on an inner face of the wheel, the guard rail (1) and the ramp (2) interacting in order to center the wheels and to prevent any lateral displacement thereof during measurement; a steel profile which forms the running support (3) and which, once the wheels have been centered with respect to the guard rail (1) and the ramp (2), reduces its thickness, causing running to take place on that part of the running profile of the wheel which is opposite its flange and thus leaving space for the measurement to be made; a pneumatic subsystem (7) which, as the train passes, activates the measurement installation, raising its components and retracting them once the measurement operation has been completed; an L-shaped reference rule (8) which is placed in contact with the flange of the wheel as the latter passes and which is rigidly joined to a base (14) which can be raised by pneumatic cylinders; mechanical feelers (4) which pick up the displacement between the flange of the wheel, taken as reference zone, and three points of its profile to be measured, giving rise to the generation of electrical signals which are used to determine the circumferential profile of the wheel; an electronic system (11) for processing said signals; and a computer system (12) for presenting, on a monitor (13), graphs showing the profile, the offset and the shape error of the wheel.

2. Installation according to claim 1, characterized in that it includes two pneumatic cylinders for raising the base (14) of the reference rule (8).

3. Installation according to claim 1, characterized in that said mechanical feelers (4) consist of narrow rules which are each joined together at the base (14) of the reference rule (8) by means of individual articulated mechanisms (9) and in that they act directly on potentiometers (5) which generate said electrical signals.

4. Installation according to claim 3, characterized in that it incorporates three rules (4).

5. Installation according to claim 3, characterized in that encoders (6), for generating electrical revolution signals, from which the displacement of the rules (4) vis-a-vis the circumferential profile of the wheel is indirectly obtained, are mounted on the articulated mechanisms (9).

6. Installation according to claim 3, characterized in that the articulated mechanisms (9) are stressed by springs (10) which cause the rules (4) always to remain in contact with the running profile of the wheel.

* * * * *